(12) United States Patent
Dutta et al.

(10) Patent No.: US 7,661,141 B2
(45) Date of Patent: Feb. 9, 2010

(54) SYSTEMS AND METHODS THAT OPTIMIZE ROW LEVEL DATABASE SECURITY

(75) Inventors: Tanmoy Dutta, Sammamish, WA (US); Girish Chander, Redmond, WA (US); Laurentiu Bogdan Cristofor, Redmond, WA (US); Rodger N. Kline, Woodinville, WA (US); James R. Hamilton, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 619 days.

(21) Appl. No.: 10/885,815

(22) Filed: Jul. 7, 2004

(65) Prior Publication Data
US 2005/0177570 A1    Aug. 11, 2005

Related U.S. Application Data

(60) Provisional application No. 60/543,855, filed on Feb. 11, 2004.

(51) Int. Cl.
*G06F 7/04*   (2006.01)
*G06F 17/30*   (2006.01)
*H04N 7/16*   (2006.01)

(52) U.S. Cl. ............... 726/26; 726/4; 707/1; 707/3; 707/5; 707/9; 707/100; 707/101; 707/103 Y; 707/103 R

(58) Field of Classification Search ............... 726/4, 726/26; 701/1, 3, 5, 9, 100, 101, 103 Y, 103 R
See application file for complete search history.

(56) References Cited

U.S. PATENT DOCUMENTS

| | | | |
|---|---|---|---|
| 5,261,102 A | 11/1993 | Hoffman | |
| 5,414,834 A | 5/1995 | Alexander et al. | |
| 5,734,887 A | 3/1998 | Kingberg et al. | |
| 5,787,428 A * | 7/1998 | Hart | ........................ 707/9 |
| 5,911,143 A | 6/1999 | Deinhart et al. | |
| 5,941,947 A | 8/1999 | Brown et al. | |
| 5,943,671 A | 8/1999 | Kleewein et al. | |
| 5,956,715 A | 9/1999 | Glasser et al. | |

(Continued)

OTHER PUBLICATIONS

Vorwerk, et al. "On Implicate Discovery and Query Optimization". IEEE: Proceedings of International Database Engineering and Application Symposium: 2002. http://ieeexplore.org/iel5/7997/22119/01029651.pdf?arnumber=1029651.*

(Continued)

*Primary Examiner*—Kambiz Zand
*Assistant Examiner*—Kari L Schmidt
(74) *Attorney, Agent, or Firm*—Workman Nydegger

(57) ABSTRACT

The systems and methods of the present invention facilitate database row-level security by utilizing SQL extensions to create and associate named security expressions with a query initiator(s). Such expressions include Boolean expressions, which must be satisfied by a row of data in order for that data to be made accessible to the query initiator. In general, a query is augmented with security expressions, which are aggregated and utilized during querying rows of data. The systems and methods variously place security expressions within a query in order to optimize query performance while mitigating information leaks. This is achieved by tagging security expressions as special and utilizing rules of predicate to pull or push non-security expressions above or below security expressions, depending on the likelihood of a non-security being safe, as determined via a static and/or dynamic analysis.

23 Claims, 9 Drawing Sheets

U.S. PATENT DOCUMENTS

| | | | |
|---|---|---|---|
| 6,308,173 | B1 | 10/2001 | Glasser et al. |
| 6,397,206 | B1 | 5/2002 | Hill et al. |
| 6,405,212 | B1* | 6/2002 | Samu et al. ............. 707/103 R |
| 6,412,070 | B1 | 6/2002 | Van Dyke et al. |
| 6,658,407 | B1* | 12/2003 | Bailey ........................... 707/3 |
| 6,715,081 | B1 | 3/2004 | Attwood et al. |
| 6,820,082 | B1* | 11/2004 | Cook et al. ..................... 707/9 |
| 6,836,770 | B2* | 12/2004 | Gonnet ........................... 707/3 |
| 7,346,617 | B2 | 3/2008 | Wong |
| 2002/0147714 | A1 | 10/2002 | Koo et al. |
| 2003/0014394 | A1* | 1/2003 | Fujiwara et al. ................ 707/3 |
| 2004/0044655 | A1* | 3/2004 | Cotner et al. .................. 707/3 |
| 2004/0068661 | A1* | 4/2004 | Dettinger et al. ............ 713/200 |
| 2004/0073565 | A1* | 4/2004 | Kaufman et al. ............ 707/101 |
| 2004/0139043 | A1* | 7/2004 | Lei et al. ........................ 707/1 |
| 2004/0158551 | A1* | 8/2004 | Santosuosso ................... 707/2 |
| 2005/0071143 | A1* | 3/2005 | Tran et al. ..................... 703/11 |
| 2005/0273854 | A1* | 12/2005 | Chess et al. ................... 726/22 |

OTHER PUBLICATIONS

Narayana Vyas Kondreddi. Implementing row level security in SQL Server databases. Dec. 15, 2001. http://vyaskn.tripod.com/row_level_security_in_sql_server_databases.htm.*

C. Anticoli European Search Report, Munich, Germany. Jun. 3, 2005. 2 pages.

Ueli Maurer, The Role of Cryptography in Database Security, SIGMOD 2004, Jun. 13-18, 2004, 6 pages, ACM.

Marianne Winslett, et al., Formal Query Languages for Secure Relational Databases, ACM Transactions on Database Systems, 1994, pp. 626-662, vol. 19 No. 4.

Sushil Jajodia, Database Security and Privacy, ACM Computing Surveys, Mar. 1996, pp. 129-131, vol. 28 No. 1, CRC Press.

Gottfried Vossen, et al., An Extension of the Database Language SQL to Capture More Relational Concepts, SIGMOD Record, Dec. 1988, pp. 70-78, vol. 17 No. 4.

Ramzi A. Haraty, C2 Secure Database Management Systems—A Comparative Study, SAC '99, 1998, pp. 216-220, ACM, San Antonio, Texas.

Shariq Rizvi, et al., Extending Query Rewriting Techniques for Fine-Grained Access Control, SIGMOD 2004, Jun. 13-18, 2004, 12 pages, ACM.

Tor Didriksen, Rule Based Database Access Control—A Practical Approach, RBAC '97, 1997, pp. 143-151, ACM.

Torsten Priebe, et al., Towards OLAP Security Design—Survey and Research Issues, DOLAP '00, 2000, pp. 33-41, ACM, McLean, VA, USA.

Andrew Eisenberg, et al., SQL:1999, Formerly Known as SQL3, SIGMOD Record, Mar. 1999, pp. 131-138, vol. 28 No. 1.

G. Widerhold, et al., Web Implementation of a Security Mediator for Medical Databases, Database Security XI: Status and Prospects, pp. 60-72, 1998.

W.Eβmayr, et al., The Security Architecture of IRO-DB, In Proc. of the 12th IFIP International Conference on Information Security, IFIP/SEC 1996, 12 pages.

T. Marius Truta, et al., Privacy and Confidentiality Management for the Microaggregation Disclosure Control Method: Disclosure Risk and Information Loss Measures, ACM Workshop on Privacy in the Electronic Society, pp. 21-30, 2003.

OA dated Jan. 6, 2009 for U.S. Appl. No. 10/903,338, pp. 16.

* cited by examiner

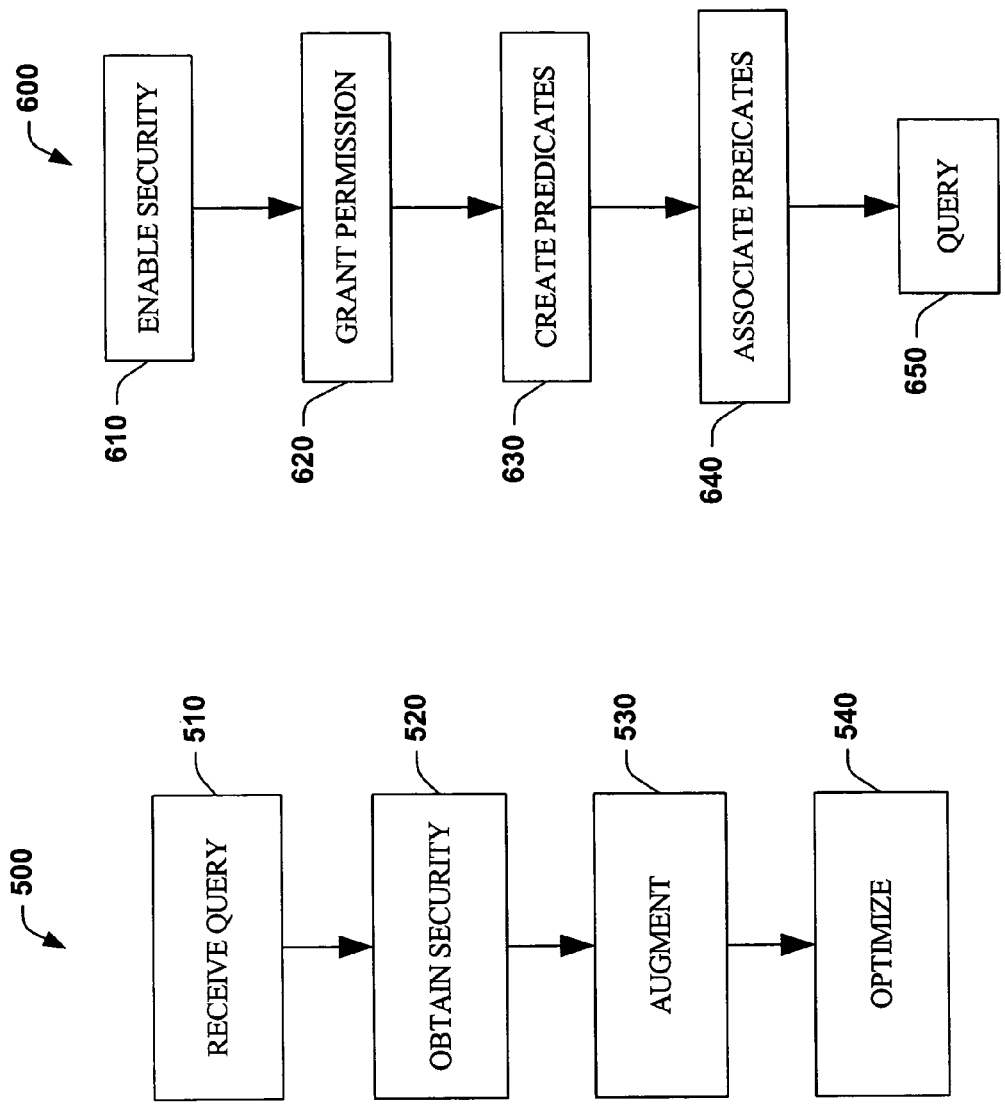

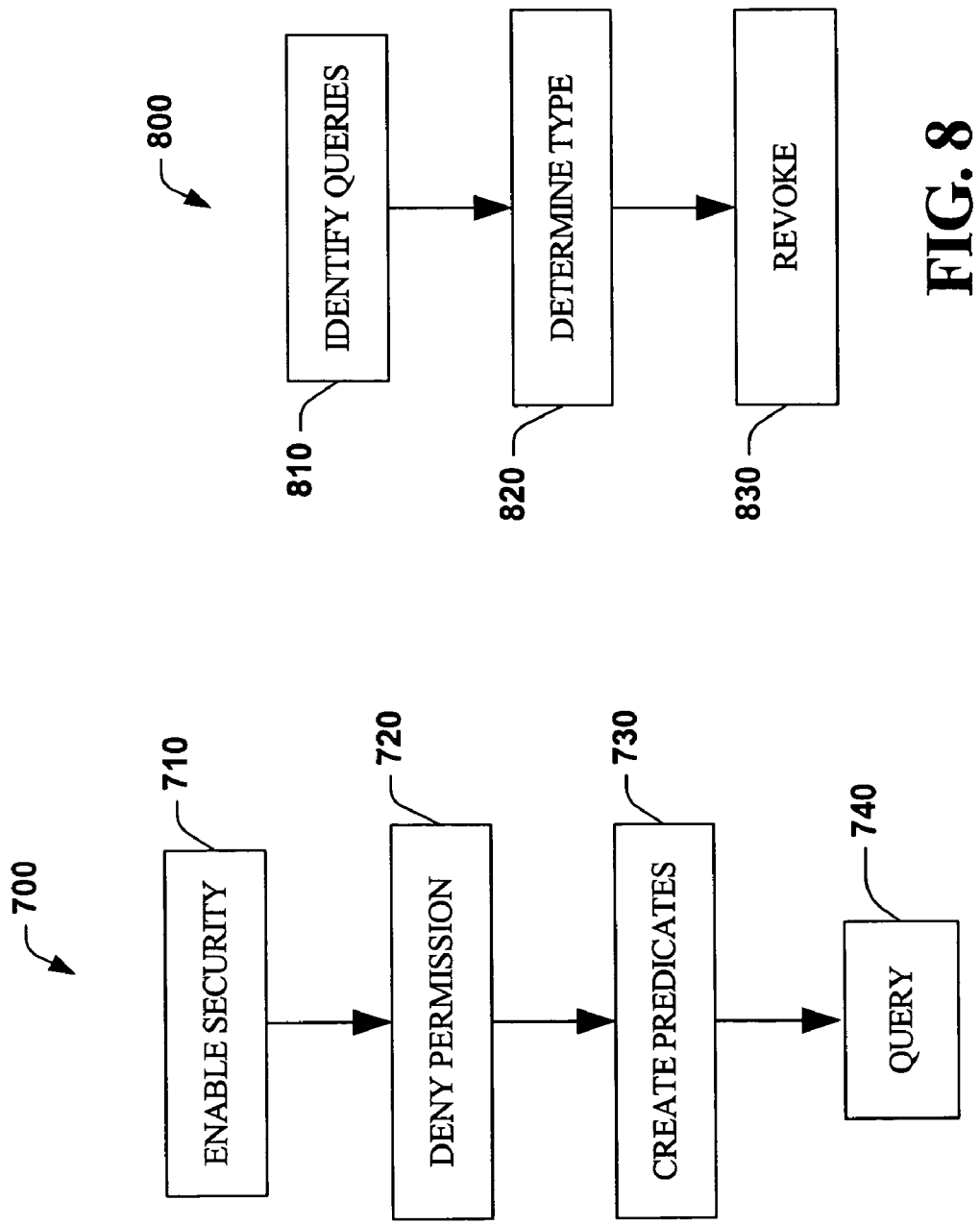

SYSTEMS AND METHODS THAT OPTIMIZE ROW LEVEL DATABASE SECURITY

CROSS-REFERENCE TO RELATED APPLICATION(S)

This application claims the benefit of U.S. Provisional Patent Application Ser. No. 60/543,855 filed on Feb. 11, 2004, and entitled "SYSTEMS AND METHODS THAT PROVIDE ROW LEVEL SECURITY FOR DATABASE TABLE ROW," the entirety of which is incorporated herein by reference.

This application is related to U.S. patent application Ser. No. 10/903,338 entitled "SYSTEMS AND METHODS THAT SPECIFY ROW LEVEL DATABASE SECURITY," and filed on Jul. 30, 2004.

TECHNICAL FIELD

The present invention generally relates to databases, and more particularly to systems and methods that augment queries with row-level security expressions to optimize performance and mitigate data leaks.

BACKGROUND OF THE INVENTION

Technological advances in computer hardware, software and networking have lead to increased demand for electronic information exchange rather than through conventional techniques such as paper and telephone correspondence, for example. Such electronic communication can provide split-second, reliable data transfer between essentially any two locations throughout the world. Many industries and consumers are leveraging such technology to improve efficiency and decrease cost through web-based (e.g., on-line) services. For example, consumers can purchase goods, review bank statements, research products and companies, obtain real-time stock quotes, download brochures, etc. with the click of a mouse and at the convenience of home.

As the amount of available electronic data grows, it becomes more important to store such data in a manageable manner that facilitates user-friendly and quick data searches and retrieval. Today, a common approach is to store electronic data in one or more databases. In general, a typical database is an organized collection of information structured such that a computer program, for example, can quickly search and select data. Traditionally, data stored within a database is organized via one or more tables, wherein respective tables comprise sets of records and a record comprises a set of fields. Records are commonly indexed as rows within a table and the record fields are commonly indexed as columns such that a row/column pair can reference particular datum within a table.

Data stored in a database often includes personal (e.g., bank account and social security numbers) and sensitive information (e.g., medical records) and may not be backed up via hard copies. Therefore, security related to databases and data stored therein is growing in importance. However, many present database security techniques can be breached, for example, through software holes and/or by software hackers with malicious intent, or do not provide a comprehensive level of security.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The systems and methods of the present invention facilitate database row-level security by providing enhanced syntax that can be utilized to create and associate named security expressions with one more query initiators. Such expressions can include predicates, represented as arbitrary Boolean expressions, which must be satisfied by a row of data in order for the data to be made accessible to the query initiator. In general, when row level security is activated, a received query is augmented with security expressions associated with the query initiator. These expressions are utilized during querying rows of data, wherein rows that satisfy the security expressions (or evaluate to "true") are made accessible to the query initiator. In one particular example, a received query is augmented by grafting an expression composed of the conjunction of the disjunction of Boolean expressions that grant row access when satisfied and the conjunction of the complement of Boolean expressions that deny row access when satisfied. In other words, the query is augmented such that row data satisfies an aggregated security expression when at least one grant expression is satisfied and no deny expressions are satisfied.

The systems and methods can variously place and move expressions, including security expressions, within a query in order to optimize query performance. Conventional techniques do not contemplate whether one or more of the security expressions should be evaluated prior to other expressions. Thus, conventional systems are susceptible to leaks wherein a user can gain access to data that should not be visible to the user. The present invention mitigates such leaks. Typically, this is achieved by tagging security expressions as special in order to discriminate between security expressions and non-security expressions. Rules of predicate movement can then be utilized to facilitate mitigation of data leaks. These rules allow non-security expressions to be pulled above or pushed below security expressions only under restricted circumstances. In many instances, a static analysis can be performed at compile time to determine whether an expression is a "safe" expression, or an expression that can be run without risk of information disclosure. In other instances, a dynamic analysis alternatively or additionally can be performed at run time to determine whether an expression is a "safe" expression. With dynamic analysis, results typically are not returned and changes typically are not made until the security predicates have been successfully run and/or no safety violations (e.g., error condition, interrupt, event . . . ) are encountered. With both static and dynamic analysis, if no safety violations are found, the ordering in which expressions are arranged can be determined to improve performance. However, if a safety violation is detected, the query can be aborted or run in "safe" mode, wherein security expressions are evaluated prior to running non-security expressions. In general, logical operations are deemed "safe."

Security expressions can be associated with a query initiator through a database language such as SQL. For example, security expressions can be created using an SQL CREATE utility. Created security expressions can be associated with a query initiator through an SQL GRANT or an SQL DENY utility. A grant and/or deny security expression can be revoked through an SQL REVOKE utility and security expressions can be dropped through a SQL DROP utility. Such security expressions typically are incorporated into a query and utilized when querying the data. In general, a granted security expression is one that provides access to a row of data when the row satisfies the grant security expression and a deny security expression is one that prohibits access to a row of data when the row satisfies the deny security expression. As noted above, a plurality of security expressions can be associated with a query initiator; thus, both grant and deny security expressions can be associated with a user. Typically, a deny security expression supersedes a grant such that a row that satisfies both types of security expressions is not made available to the query initiator. In addition, the complement of deny security expressions can be utilized such that an aggregate result from evaluating a row of data with a plurality of security expressions renders a "true" when at least one grant security expression is satisfied and no deny security expressions are satisfied.

Conventionally, in order to associate security with a row, respective rows needed to be identified. However, many database programming languages do not account for identifying respective rows in a table with an address. In some cases, a primary key can be utilized as an address for a table. However, not every table has an associated primary key. Furthermore, associating security such that respective rows in a table can be individually identified can lead to data management problems since there may be a large number of rows in a table. Moreover, storing security information within respective rows can be inefficient and consume space, especially if the values stored in respective rows are not very large. In addition, many database programming languages prescribe a syntax by which security can be specified on a table or one or more of its constituent columns, but not on respective rows. The novel systems and methods of the present invention can be utilized to mitigate the aforementioned shortcomings through enhanced SQL syntax.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 5 illustrates a methodology for implementing row-level database security.

FIG. 6 illustrates a methodology for granting row-level security permission over table rows.

FIG. 7 illustrates a methodology for denying row-level security permission over table rows.

FIG. 8 illustrates a methodology for revoking grant and/or deny row-level security permission over table rows.

DESCRIPTION OF THE INVENTION

Figure 1:
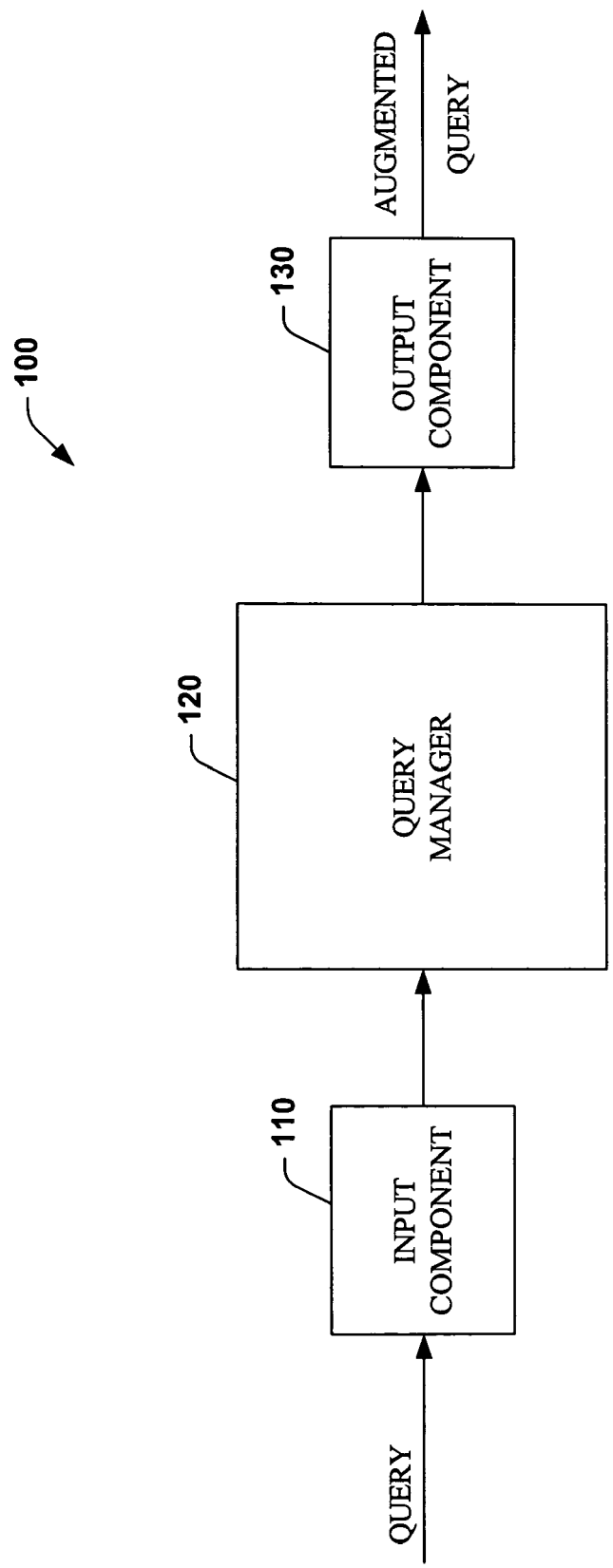
FIG. 1 illustrates a system that facilitates data access security by augmenting queries with security expressions.

As used in this application, the terms "component," "system," "manager," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The present invention relates to systems and methods for implementing row-level database security. Such security enables one or more sets of rows with similar security characteristics to be logically clustered and treated together as a named expression with one or more programming statements, such as Boolean expressions, defined over, but not restricted to tables and/or contextual data. The security expressions can be variously augmented to a query in order to arrange the predicates of the query to optimize performance and mitigate security leaks. In addition, the security expressions can be aggregated such that satisfying (e.g., returning "true") the aggregate provides access to a row(s) of data, while not satisfying (e.g., returning "false") the aggregate restricts access to a row(s) of data.

The present invention is described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 that facilitates data access security when querying data. The system 100 comprises an input component 110, a query manager 120, and an output component 130. The input component 110 receives queries. Such queries can be initiated from essentially any database programming language such as SQL, for example, and directed over a data repository that includes one or more databases, tables, contextual information, etc.

The query manager 120 can augment a received query to incorporate data security therein. Such security can be created by the owner of data within the data repository, wherein the created security provides security for that owner's data. The security can be applied over various formats or structures of the data. For example, where the data is associated with rows, tables and/or columns, the security can be applied over none, all or any combination thereof. In addition, the security can be constructed such that satisfying the security provides access to the data or satisfying the security prohibits access to the data. It is to be appreciated that the security can be comprised of a plurality of different security, some of which can provide access and some of which can prohibit access.

Moreover, the creator of the table can link one or more of the security expressions to one or more queriers. In general, if security is not linked, the querier will not be able to see any data. When security is linked to a querier, the querier will only be able to access the data when the data satisfies at least one security expression that provides access to the data and does not satisfy any security that denies access to the data. Typically, deny access security supersedes grant access security so that when data satisfies both types of security, access is denied. In addition, both a grant and deny security can be revoked. The foregoing enables the owner of data the ability to selectively determine who can access which portions of his data. In addition, the querier can be attributed with an exempt status such that the security does not apply to the querier and the querier can essentially access all the data. Typically the owner of the table is exempt in this manner from all row level security restrictions.

Augmented queries can be conveyed to the output component 130. The output component 130 can provide such queries for further processing or to a component, including itself, that queries the data.

Figure 2:
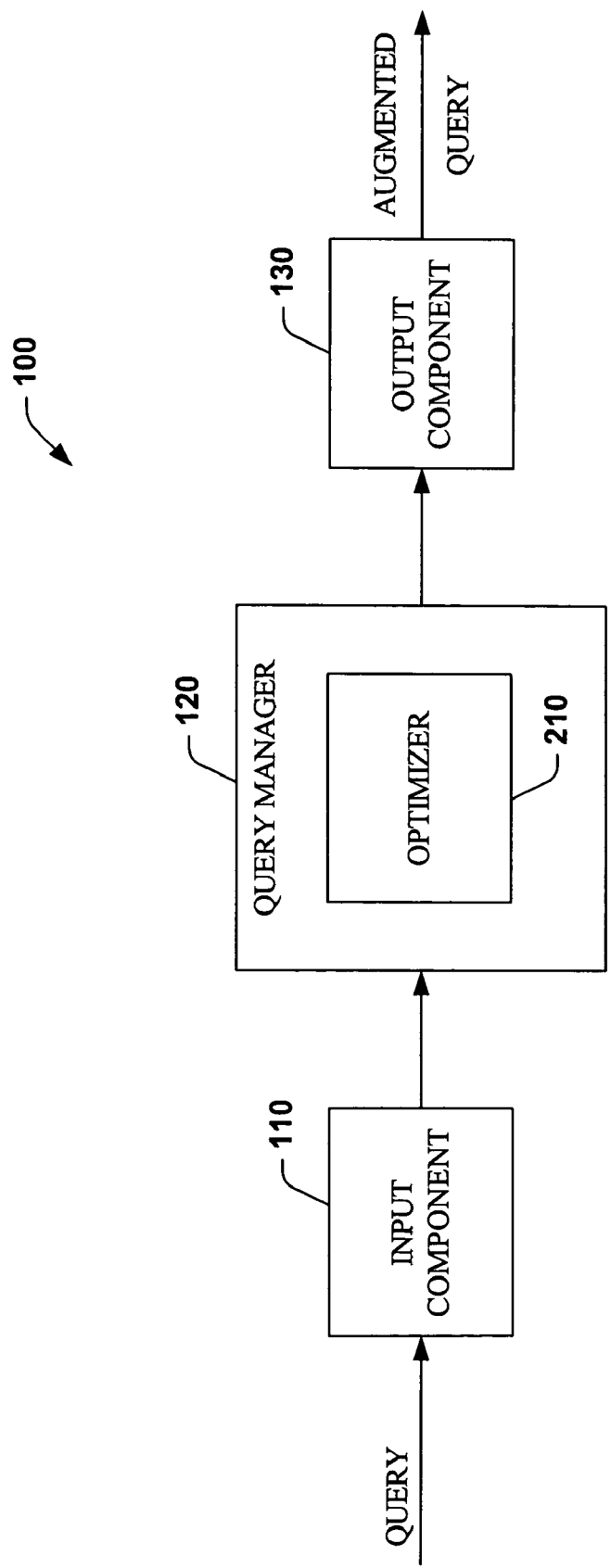
FIG. 2 illustrates a data security system that optimizes security-augmented queries for performance.

FIG. 2 illustrates the data security system 100 with the input component 110, the query manager 120, the output component 130, and, additionally, an optimizer 210. As noted above, the input component 110 receives requests for queries over a data repository of variously structured data. The query manager 120 augments requests to incorporate data security expressions therein. Such security can be created by the owner of data within the data repository, wherein the created security provides security for that owner's data. The security can be defined through expressions, such as Boolean expressions that evaluate to binary values such as "true" and "false," or "1" and "0," which can be defined to indicate security clearance and restricted access.

When more than one expression is utilized, respective expressions can be serially or concurrently evaluated and individual results can be aggregated (e.g., ANDed and ORed together) to render a decision. As briefly indicated above, expressions can be generated that expressly allow (e.g., grant) or prohibit (e.g., deny) access to data when satisfied. Since satisfying a data prohibiting such expression results in a "true," the complement can be utilized so that satisfying such expression results in "false." Thus, an aggregated expression can be created that returns "true" when at least one grant expression is satisfied and no deny expressions evaluate to "true." It is to be appreciated that although Boolean expressions can be employed, other techniques can be utilized in accordance with an aspect of the present invention. Such techniques may be able to provide a probability and/or confidence level and incorporate an adjustable threshold to define a cut-off point.

The optimizer 210 can incorporate and move expressions, including security expressions, within a query in order to optimize the query. Conventional techniques do not contemplate whether one or more of the duly grafted security expressions should be evaluated prior to other expressions. Thus, conventional systems are susceptible to leaks wherein a user gains access to data that should not be visible to the user. The present invention mitigates such leaks. Typically, this is achieved by tagging security expressions when grafted to the query, in order to discriminate between security expressions and non-security expressions. Rules of predicate movements can then be utilized by the optimizer 210 to facilitate mitigation of information leaks. These rules allow the optimizer 210 to pull only a restricted class of non-security expressions above security expressions or push only a restricted class of non-security expressions below security expressions.

In many instances, a static analysis can be performed at compile time to determine whether an expression is a "safe" expression, or an expression that can be run without risk of information disclosure. In other instances, a dynamic analysis alternatively or additionally can be performed at run time to determine whether an expression is indeed a "safe" expression. With dynamic analysis, results typically are not returned and changes typically are not made until the query has been successfully completed with no safety violations (e.g., error condition, interrupt, event . . . ) encountered during the execution. With both static and dynamic analysis, if no safety violations are found, the ordering in which expressions are arranged can be determined by the optimizer 210 to improve performance. However, if a safety violation is detected, the query can be aborted or run in "safe" mode, wherein security expressions are evaluated prior to running non-security expressions. Tagging security predicates specially in the query, allows for such execution plans. For static analyses, in general, logical operations commonly are deemed "safe." Upon augmenting a query with security expressions and optimizing the expressions within the query, the query can be conveyed to the output component 130. The output component 130 can provide the augmented queries for further processing or querying over data.

Figure 3:
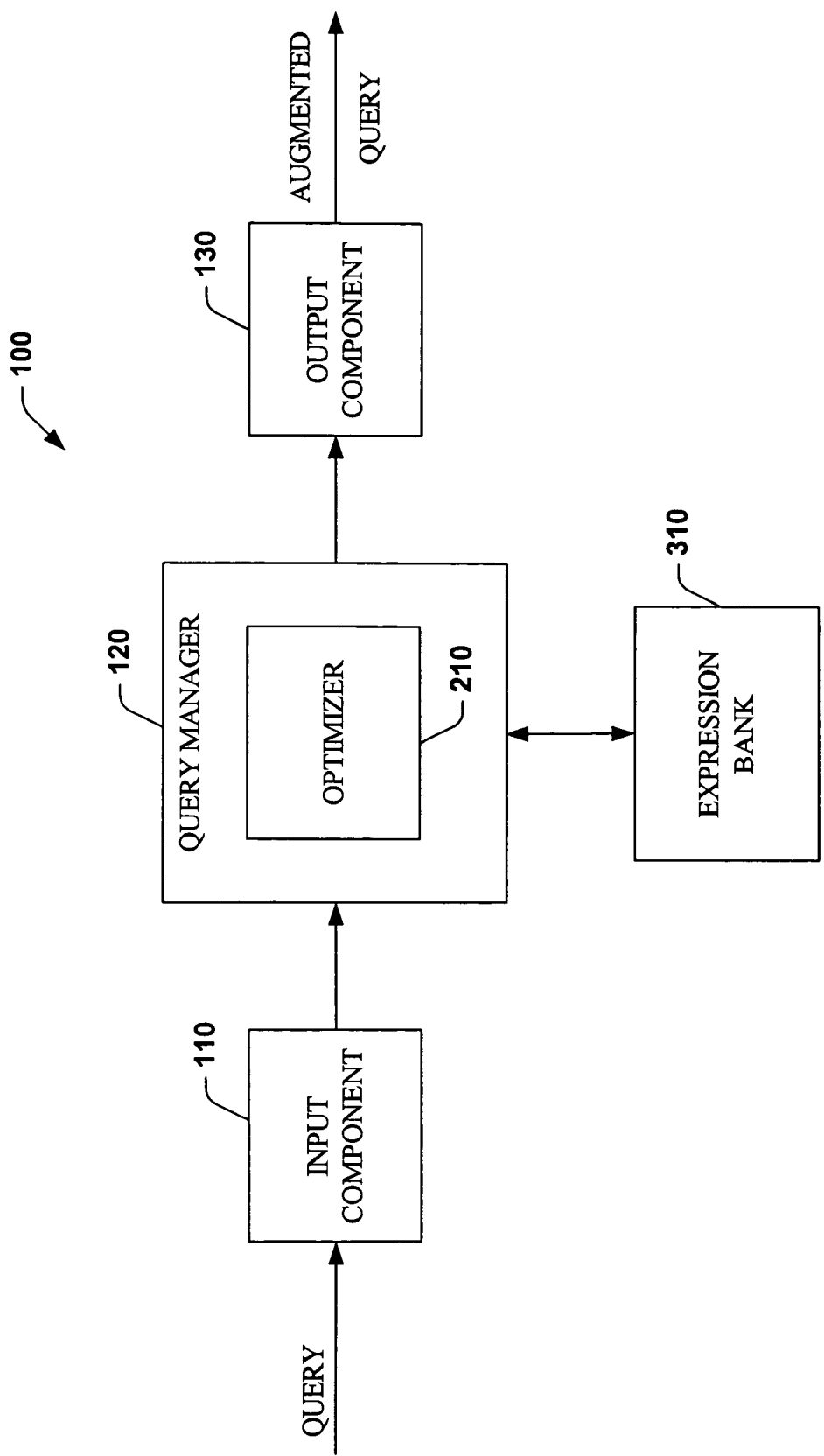
FIG. 3 illustrates a data security system that augments queries with security expressions stored in an expression bank by data administrators.

FIG. 3 illustrates the data security system 100 that includes the input component 110, the query manager 120, the output component 130, the optimizer 210, and, additionally, an expression bank 310. The input component 110 can serially and/or concurrently receive requests for data from one or more queriers, wherein multiple requests can be associated with similar and/or disparate data within a data repository. In addition, multiple requests can be handled serially and/or concurrently. In many instances, memory, such as a buffer (not shown), can be utilized to temporarily store request related information in order to queue requests. For example, a request labeled high priority can be received while a lower priority request is being processed, wherein lower priority requests can be cached until the higher priority request is serviced.

The expression bank 310 can be utilized to store one or more security expressions, as well as non-security expressions. Such expressions can be associated with one or more requesters and/or one or more groups of requesters. Expressions can be retrieved from the expression bank 310 upon identifying a requester. For example, a received query may include a unique identifier associated with the requester (e.g., a user, an application . . . ) or the machine that transmitted the request. In another instance, the query may be prefaced and/or followed by such information. In still other instances, intelligence can be employed to determine the requester and/or a suitable set of security expressions. The retrieved security expression(s) for a request can be employed while searching the data repository.

It is to be appreciated that an Application Program Interface (API) (not shown) can be utilized by an administrator of data to create security expressions related to their data in the expression bank 310. By way of example, the CREATE utility in the SQL programming language can be utilized to create a security expression. For example, the following SQL syntax can be utilized to create a security expression:

CREATE EXPRESSION<expression_name>
ON<data_name> AS (<expression>), wherein <expression_name> specifies a name of the expression, <data_name> specifies a source (e.g., one or more table name or subset thereof), and <expression> is the security expression which must be satisfied by a row(s) in order to gain access to the data within the row(s). As noted above, such expressions can be linked to particular requesters and/or groups of requesters. For example, when utilizing SQL, data administrators can link a created security expression for a particular source of data to a user and/or group of users via the GRANT, REVOKE and DENY utilities and/or remove a security expression via the DROP utility, as describe in detail below.

In one particular example, the query manager 120 can augment a query by grafting an expression composed of the disjunction (e.g., ORing) of Boolean expressions that are granted, wherein respective expressions are conjuncted (e.g., ANDed) with an associated security principal (e.g., security identity) to whom the grant is made, and conjuncting (e.g., ANDing) the resultant disjunction with the conjunction (e.g., ANDing) of the complement of respective Boolean expressions denied, wherein respective expressions are conjuncted with a security principal to whom the deny is made. In other words, the query manager can augment a query such that data can satisfy the query when at least one granted expression is satisfied and no deny expressions are satisfied. Such augmented queries can be conveyed to the output component 130 and utilized to facilitate querying data.

Figure 4:
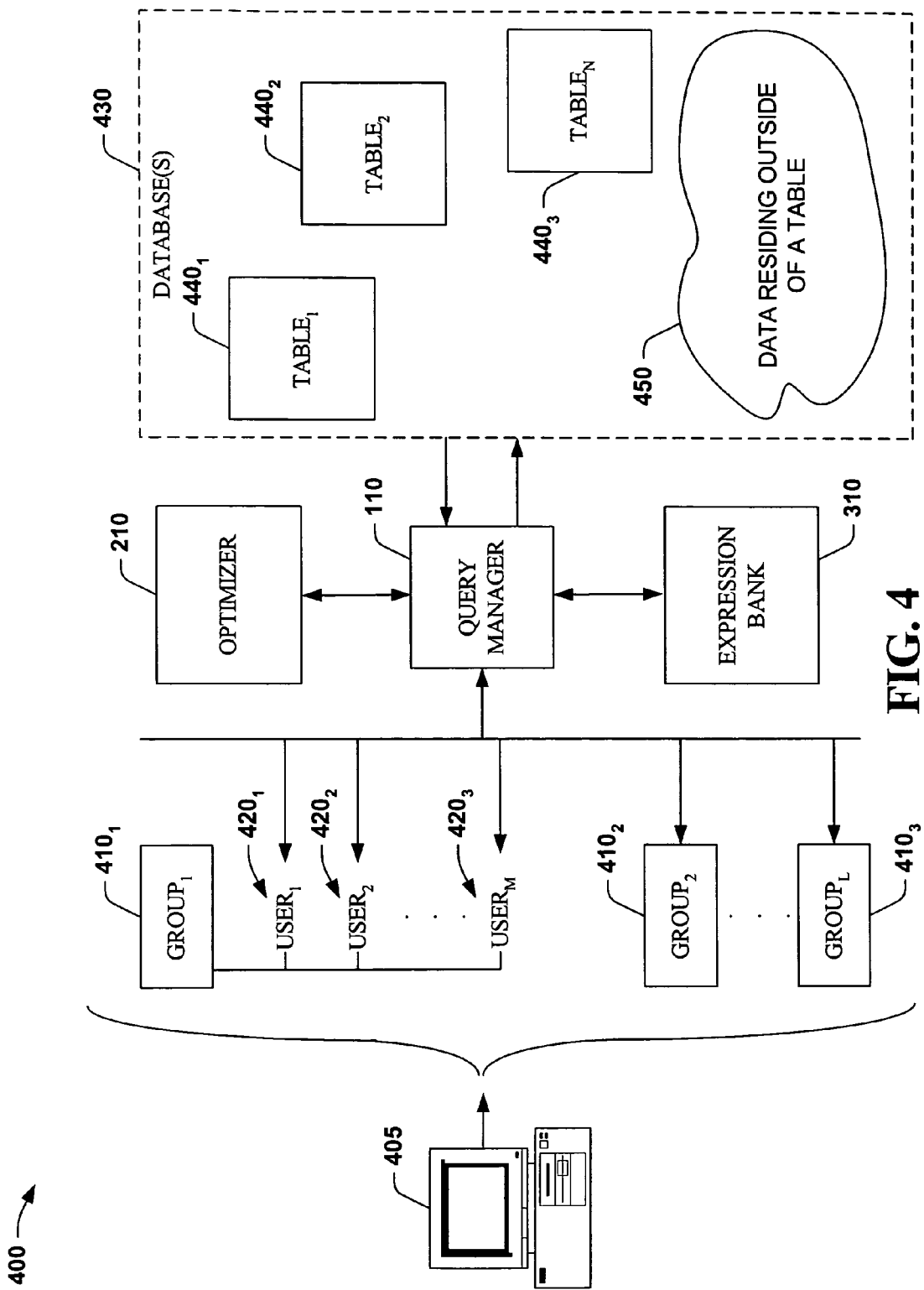
FIG. 4 illustrates a system that utilizes security-augmented queries to query a database.

FIG. 4 illustrates a system 400 that facilitates database security. The system 400 includes a user access point 405 to a database. As depicted, the user access point 405 is a desktop computer; however, it can be appreciated that any microprocessor-based device such as a portable computer (e.g., a laptop, a tablet PC . . . ), a hand held computer (e.g. a PDA), a workstation, a cell phone, etc. can be employed in accordance with an aspect of the present invention.

In many instances, the user access point 405 is coupled to a sub-network/bus within a larger network/bus (e.g., plant or corporation wide), wherein users with an account with the sub-network/bus can login to the user access point 405 and access entities and applications residing therein, within the scope of privileges (e.g., rights, properties . . . ) afforded to the user. Typically, a finer level of discrimination is utilized, wherein users associated with a network are delineated into domains, groups, projects, job descriptions, workgroups, divisions, departments, status, etc., each of which can be associated with different privileges. In addition, users within any similar delineation can be associated with different privileges. For example, a plurality of users can be grouped and one of the users can be granted supervisor status over the remaining users. Such a user commonly has privileges to restrict the other users. For instance, the supervisor can modify another user's read, write and execute privileges, ability to view particular information and/or Internet capabilities.

In the present example, users are delineated into L such groups, wherein L is an integer equal to or greater than one. The L groups comprise a $group_1$, $410_1$, a $group_2$ $410_2$, through a $group_L$ $410_3$, which can be collectively referred to as groups 410. The groups 410 can include different and/or similar users. Thus, a particular user can be associated with multiple groups. The $group_1$ $410_1$ is shown to include M users, wherein M is an integer equal to or greater than one. The M users comprise a $user_1$ $420_1$, a $user_2$ $420_2$, through a $user_M$ $420_3$. Such users can be collectively referred to as users 420. When one of the users 420 logins to the access point 405, a user identity (e.g. unique ID, alias . . . ), group name, domain name, workgroup, etc. can be determined and utilized to configure the environment for the user. Such configuration can include executing a customized interface, hiding data, revealing data, setting read, write and/or execute privileges, etc.

This user can communicate with a database(s) 430 through the query manager 110. For example, when transmitting a query over the database(s) 430 the query can be received by the query manager 110, which can obtain the source of the query and/or various other characteristics such as user and/or group identity. The query manager 110 can utilize this information to obtain and apply suitable security expressions. As noted above, such security can include one or more Boolean expressions, wherein these expressions can relate to criteria that enables data access when the data satisfies the criteria or criteria that mitigates data access when the data satisfies the criteria.

Security expressions can be obtained from the expression bank 310. Such expressions can be associated with one or more requesters and/or one or more groups of requesters, and retrieved upon associating a request with an expression. For example, a received query may include a unique identifier associated with the requester (e.g., a user, an application . . . ) or the machine that transmitted the request. In another instance, the query may be prefaced and/or followed by such information. In still other instances, intelligence can be employed to determine the requester and/or a suitable set of security expressions.

Security expressions can be created via the SQL programming language. For example, the SQL CREATE utility can be utilized to create a named expression for a table, wherein the named expression specifies a Boolean expression that must be satisfied by the data to gain access to the data. Such expressions can be linked to particular requesters and/or groups of requesters in order to utilize data security. For example, when utilizing SQL, data administrators can link a security expression for a particular source of data to a user and/or group of users via the GRANT, REVOKE and DENY utilities and/or remove a security expression via the DROP utility, as describe in detail below. In general, a named expression behaves as a surrogate for essentially all rows that satisfy that expression. Thus, by utilizing this technique, one could express all rows in a table and/or respective individual rows when a primary key exists on the table. In addition, virtually any number of security expressions can be defined on a table, and a single row can be satisfied by more than one expression defined on the table. The foregoing provides a mechanism to logically cluster a set of rows with similar security characteristics and treat the set as a named expression.

The query manager 210 can augment a query by grafting an expression composed of the disjunction of Boolean expressions that are granted, wherein respective expressions are conjugated with an associated security principal to whom the grant is made, and conjuncting the resultant disjunction with the conjunction of the complement of respective Boolean expressions denied, wherein respective expressions are conjuncted with a security principal to whom the deny is made. In other words, the query manager can augment a query such that data can satisfy the query when at least one granted expression is satisfied and no deny expressions are satisfied.

It is to be appreciated that a security expression for data in the database 430 can be created by the owner or manager of the data and linked to one or more users. This link can be established as an outcome of a direct grant to the user or indirectly to the user through a grant to one or more user roles, servers, groups, etc. By way of example, the a table can be defined as:

Emp(id int, salary float), wherein Emp is the table name, id is a variable of type integer and salary is a variable of type float. An expression for the table can be created through an SQL Create expression. For example, the following can be executed to create an expression for this table:

```
CREATE EXPRESSION SalLimit ON Emp AS
    (salary<X),
``` wherein SalLimit is the expression name, salary is the field to test, and X (e.g., 100000) is a variable that determines whether the row data satisfies the security expression. It is noted that various other statements such as denial and/or revocation statements can be similarly employed via corresponding expressions.

The SalLimit security expression can be linked to a user through the following grant expression syntax:

```
GRANT SELECT(where SalLimit) ON Emp TO
    User1,
``` wherein User1 is a user granted permission to data in the rows of the table that satisfy SalLimit. Such statement can imply that User1 is allowed to see the rows in the Emp table that satisfy the SalLimit expression.

In absence of a granted security expression such as the example above, the data in a row cannot satisfy an expression and, thus, the user would not be provided with access to data in any row. In addition, any row that does not satisfy such conditions is rendered not visible to user. Moreover, where a deny security expression is satisfied, the user is prohibited from seeing the data.

As noted above, security can additionally be based on columns. For example, the following statement can grant both row level and column level security.

```
GRANT SELECT(where SalLimit, Col1) ON Emp
    TO User1,
``` wherein the additional argument Col1 is utilized to specify a column within table Emp. Furthermore, there can be multiple grant, deny, and/or revoke statements on the same table. Typically, a deny statement supersedes a grant statement, however, the system can be configured alternatively. The grantee of such statements can be any principal authorized in the database system, for example, as defined by the specification.

Similarly, deny expressions for row, column and/or table level security, and revoke expressions to revoke a grant or deny are provided. An exemplary SQL deny syntax is depicted via the following:

```
DENY SELECT (WHERE<expression_name>)
    ON<data_name> TO (<user_name>),
``` where <expression_name> specifies the security expression, <data_name> specifies a source data to evaluate against the security expression, and <user_name> specifies a user or user group to associate with the named security expression, and exemplary SQL revoke syntax is depicted via the following:

```
REVOKE SELECT (WHERE<expression_name>)
    ON<data-name> FROM (<user_name>),
``` where <expression_name> specifies the security expression to revoke, <data_name> specifies a source data, and <user_name> specifies a user or user group to disassociate with the named security expression.

The optimizer 210 can move expressions, including security expressions, within the received query in order to optimize performance. In general, security expressions are tagged in order to discriminate between security expressions and non-security expressions and predicate rules are utilized to define the scope of how to incorporate security expressions within a query. The predicate rules allow the optimizer 210 to pull non-security expressions above security expressions or push non-security expressions below security expressions only after ensuring that unsafe expressions cannot be utilized to return data prior to executing security expressions. Typically, logical operations commonly are deemed "safe," and the optimizer 210 can order such operations above or below security expressions.

In many instances, an expression, such as a user-defined expression, is analyzed to determine whether it is safe. In general, logical operations commonly are deemed "safe." Such analysis can be performed statically. As described above, static analysis is performed at compile time. In contrast dynamic analysis is performed at run time. With dynamic analysis, if a safety violation is detected, the query can be aborted or run in "safe" mode, wherein security expressions are evaluated prior to running non-security expressions.

The query manager 110 can facilitate the query by applying the security expression and only returning data that satisfies the criteria. As depicted, the query is performed over the database(s) 430 that comprises N tables, a $table_1$ $440_1$, a $table_2$ $440_2$ through a $table_N$ $440_3$, wherein N is an integer greater than or equal to one, and data 450. It is noted the $table_1$ $440_1$, $table_2$ $440_2$, and $table_N$ $440_3$ can be collectively referred to as tables 440. In general, the tables 440 can store data in structured format. Such structured format can include one or more sets of entities with similar structure, wherein respective entities can be referred to as rows. Respective rows can be associated with fields that can be referred to as columns.

FIGS. 5-8 illustrate methodologies in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

Proceeding to FIG. 5, a methodology 500 for implementing row level database security is illustrated. At reference numeral 510, one or more queries from one or more users are received. Such queries can be received serially and/or concurrently and can be associated with similar and/or disparate data within the database. In addition, queries can be transmitted from a database access point such as a desktop computer, portable computer, a hand held computer, a workstation, a cell phone, etc. Upon receiving a query, a source of the query can be determined. In many instance, the source is associated with a user name, address, network, sub-network, domain, group, project, job description, workgroup, division, department, status, etc. that can be utilized to identify the user, wherein individual users can be associated with different privileges. It is noted that users within a similar delineation can be associated with similar or different privileges.

At reference numeral 520, security expression(s) for the user can be obtained. For example, the owner of data in the database can create one or more security expressions for her data and link such expressions to the user. It is to be appreciated that one or more security expressions can be created for one or more tables and provided to one or more users. Thus, data can concurrently satisfy multiple security expressions for multiple users to allow concurrent access to data. In circumstances where the source cannot be identified, intelligence can be utilized to infer a security expression and/or a default security expression can be applied.

At 530, the query can be augmented with the security expressions. When more than one expression is utilized, respective expressions can be aggregated into a logical statement via logical ANDs and/or ORs to provide a decision. In addition, such expressions can be created that expressly allow (e.g., grant) or prohibit (e.g., deny) access to data when satisfied. Since satisfying a data prohibiting such expression results in a "true," the complement can be utilized so that satisfying such expression results in "false." Thus, an aggregated expression can be created that returns "true" when at least one grant expression is satisfied and no deny expressions evaluate to "true." It is to be appreciated that although Boolean expressions can be employed, other techniques can be utilized in accordance with an aspect of the present invention.

By way of example, the query can be augmented by conjuncting the disjunction of Boolean expressions that are granted, wherein respective expressions are conjugated with an associated security principal to whom the grant is made with the conjunction of the complement of respective Boolean expressions denied, wherein respective expressions are conjuncted with a security principal to whom the deny is made. Thus, the query can be augmented such that data can satisfy the query when at least one granted expression is satisfied and no deny expressions are satisfied.

At reference numeral 540, the query can be optimized, wherein security expressions can be moved within a query in order to optimize performance. Such optimization is guided via rules of predicate, which facilitate mitigation of memory leaks. These rules allow non-security expressions to be pulled above or pushed below security expressions, depending on whether a non-security expression is "safe." In many instances, a static analysis can be performed at compile time to determine whether an expression is a "safe" expression, or an expression that can be run without risk of information disclosure. In other instances, a dynamic analysis alternatively or additionally can be performed at run time to determine whether an expression is a "safe" expression. With dynamic analysis, results typically are not returned and changes typically are not made until the security predicates have been successfully run and/or no safety violations (e.g., error condition, interrupt, event . . . ) are encountered. With both static and dynamic analysis, if no safety violations are found, the ordering in which expressions are arranged can be defined to improve performance. However, if a safety violation is detected, the query can be aborted or run in "safe" mode, wherein security expressions are evaluated prior to running non-security expressions. In general, logical operations commonly are deemed "safe."

The augmented query can be utilized while querying over the database. For example, database data can be evaluated while performing a query in order to determine whether data satisfies the security. If the data satisfies the security, the data can be made available to the requester, for example, such that the requester can view, download and/or manipulate the data.

FIG. 6 illustrates a methodology 600 for enabling row-level database security in order to provide row level access. At reference numeral 610, row level security is enabled. For example, the following SQL statement can be utilized to activate row level access on a table: ALTER TABLE Orders SET ROW_SECURITY=ON. Typically, without activating row-level access, either none of the rows or all of the rows are accessible to users. At reference numeral 620, permission is granted to a user via a GRANT SELECT command. At 630, user restrictions are associated with the user through the CREATE EXPRESSION command. At 640, predicates are associated to relevant roles on one or more table through a GRANT "where" Statement. At 650, the query can be augmented with the predicates and the augmented query can be employed, wherein data that satisfies the security expressions is provided to the user. It is to be appreciated the a plurality of grant security expressions, as well as deny security expressions, as described herein, can be incorporated within a query and utilized during querying data.

FIG. 7 illustrates a methodology 700 for enabling row-level database security in order to deny row level access. At reference numeral 710, row level security is enabled (e.g., ALTER TABLE Orders SET ROW_SECURITY=ON). At 720, the SQL DENY EXPRESSION command can be utilized to deny permission to data to a user. At reference numeral 730, security statements (e.g., Boolean expressions) are associated with relevant roles on one or more table. At 740, the security statements are inserted into queries and utilized while querying. Where data evaluated with a security statement satisfies a deny expression, the data is hidden from the user. In general, a deny security expression supersedes a grant security expression such that a user will not be able to access data that is associated with a grant and a deny expression, where the data satisfies both types of expressions. Usually, the complement of the deny expression will be aggregated with the grant expression such that satisfying the aggregated expression provides access to the data.

FIG. 8 illustrates a methodology 800 for revoking row-level database security. At reference numeral 810, a query is received and the query initiator is identified. At reference numeral 920, a data administrator ascertains the security expressions associated with the user and selects security expressions that the user no longer wishes to be associated with the user. As noted above, both grant and deny security expression can be associated with a user. At 930, the REVOKE command can be utilized to sever, or terminate the selected grant and/or deny security expression association with the user.

Figure 9:
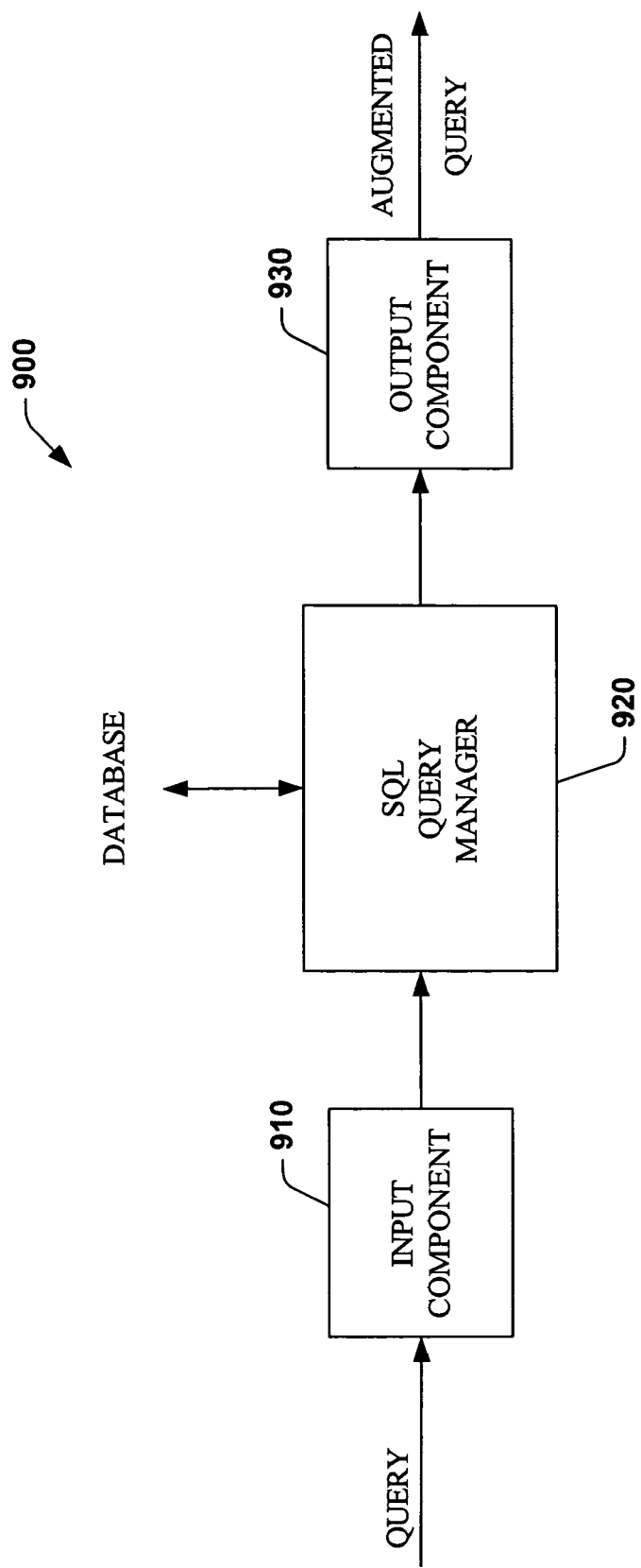
FIG. 9 illustrates an exemplary SQL query management system.

FIG. 9 illustrates an exemplary SQL query management system 900. The SQL query manager 900 comprises an input component 910 that accepts queries for data, an SQL query manager 920 that facilitates augmenting such queries with security expressions, and an output component 930 that provides results to users. The system 900 can utilize SQL utilities such as CREATE; DROP; GRANT; REVOKE; and DENY, to facilitate access control at the row level and are advantageous when employing, inter alia, a SELECT, an UPDATE, a DELETE, and/or an INSERT action on a table. The following provides exemplary CREATE; DROP; GRANT; REVOKE; and DENY syntax and corresponding explanations and examples and SELECT, UPDATE, DELETE and INSERT examples in accordance with an aspect of the present invention.

Create

Predicates that are to be applied to a table to activate row-level access control (e.g., security) can be created using a DDL CREATE EXPRESSION. Such predicates can be given a name and applied to the table utilizing syntax (e.g., GDR) with the name of the expression.

Syntax:

```
CREATE EXPRESSION<expression_name>
    ON<tablename> AS (<expression>)
```

The CREATE utility can create on table<tablename> an expression as stipulated in <expression> and can assign it a name called<expression_name>.

Restrictions:
Sub-queries typically cannot be included
Function calls can be included if an expression comprises references to functions and the creator reference permissions on these functions
An expression should be given a name (expression_name)
The expression_name should be unique
Permissions:
Members of a db_ddladmin, a db_owner role, a sysadmin role, a table owner and users with FULL CONTROL permission at the database, schema and/or table level can have permission to create expressions on that table. In addition, users with ALTER ANY TABLE and/or ALTER on the table have permission to create an expression on the table.

EXAMPLE

CREATE EXPRESSION My_Filter ON shipTable AS
(ship_city='redmond' and order_num>35)

Drop

Predicates created using the CREATE EXPRESSION statement can subsequently be dropped using the DROP EXPRESSION statement.
Syntax:

DROP EXPRESSION<expression_name>
ON<Tablename>

Restrictions:
An expression_name specified typically must already exist.
The current user typically needs to be a member of a db_ddladmin, a db_owner and/or a sysadmin role, an owner of the table on which the expression is identified, and/or have FULL CONTROL and/or ALTER permission on the table to drop the expression.
The expression generally can only be dropped if it is not currently being utilized for establishing row level security on a table.
If any restriction is violated, an error (e.g., "Expression may not exist or may be in use or you do not have permission to execute this statement") can be returned.

---

GRANT

Syntax:
GRANT
{
  ALL [ PRIVILEGES ]
  |
  [BEFORE | AFTER] permission
 [WHERE (<expression_name> [, . . . n]) [, . . . n ].
}
{
  [ ( column | [ , . . . n ] )] ON { table | view }
  ON { table | view } [ ( column | [ ,...n ] )]
  ON { stored_procedure | extended_procedure }
  | ON { user_defined_function }
}
TO security_account [ , . . . n ]
[ WITH GRANT OPTION |
]
[ AS { group | role } ]

---

The UPDATE permission can be prefixed with a BEFORE or an AFTER. The BEFORE or AFTER typically can only be specified if row level security is being specified. In general, BEFORE implies that the predicate applies to the pre image of the row; security is based on the current values in the row. AFTER implies that the security is based on the post image; the values utilized to update the row. The <expression_name> is the name of the expression (e.g., created earlier via CREATE EXPRESSION syntax) that is utilized to initiate the security restrictions.

Restrictions:
A GRANT typically has to be on a table.
A permission typically applies at the table level.
A WITH GRANT OPTION typically will be allowed when specifying row level restrictions. Further grants generally can be made by the grantee on this expression.
<expression_name> typically must be a valid expression name that was already specified through the CREATE EXPRESSION statement.
A user issuing the GRANT typically needs to be the owner of the table or have full control permissions on the table or member of a db_owner, a db_securityadmin and/or a sysadmin role.

EXAMPLE

GRANT SELECT WHERE (Myfilter) ON Table1 TO RedMgrs
GRANT BEFORE UPDATE WHERE (Filter2) ON Table2 TO public

---

REVOKE

Syntax:
REVOKE [ GRANT OPTION FOR ]
{
  ALL [ PRIVILEGES ]
  |
  [BEFORE | AFTER] permission
 [WHERE (<expression_name> [, . . . n]) [, . . . n ].
}
{
  [ ( column | [ , . . . n ] )] ON { table | view }
  | ON { table | view } [ ( column | [ , . . . n ] ) ]
  | ON { stored_procedure | extended_procedure }
  | ON { user_defined_function }
}
{ TO | FROM }
  security_account [ , . . . n ]
[ CASCADE ]
[ AS { group | role } ]

---

REVOKE can be used to revoke a security permission that was already applied through a GRANT or a DENY.
Restrictions:
The <expression_name> typically must be a valid expression name already specified on the table using an earlier GRANT or DENY for the particular permission being revoked.
A column name or the expression being revoked typically can be specified.
A CASCADE option typically will apply for REVOKE's of expressions based GRANTS or DENYS. This typically will have to be the same expression specified in an earlier GRANT or DENY and a subset of rows defined by expressions already granted cannot be revoked.
For the REVOKE to succeed, the user typically needs to be a table owner or must have FULL CONTROL permissions on the table or a member of a db_securityadmin, a db_owner and/or a sysadmin role.

EXAMPLE

REVOKE SELECT WHERE (MyFilter) ON Table1 TO RedMgrs

---
DENY
---

```
Syntax:
DENY
{
   ALL [ PRIVILEGES ]
   |
   [BEFORE | AFTER] permission
[WHERE (<expression_name> [, ... n]) [, ... n ].
}
{
   [ ( column | [ , ... n ] )] ON { table | view }
   | ON { table | view } [ ( column | [ , ... n ] )]
   | ON { stored_procedure | extended_procedure }
   | ON { user_defined_function }
}
TO security_account [ , ... n ]
[ CASCADE ]
```

The <expression_name> is the name of the expression (created through an earlier CREATE EXPRESSION syntax) that is used to bring about the security restrictions Restrictions:

A DENY typically is on a table.

A permission typically applies at the table level.

The CASCADE option typically is allowed when specifying row level restrictions, and this will deny at the first level and revoke at lower levels the exact same expression if granted, but not any subset of it.

The <expression_name> typically must be a valid expression name already specified through the CREATE EXPRESSION statement.

A user issuing the DENY typically needs to be the owner of the table or member of the a db_owner, a db_securityadmin and/or a sysadmin role.

EXAMPLE

DENY SELECT WHERE (MyFilter) ON Table1 TO BelvMgrs

These expressions can be included in a sysobjects object. In addition, a corresponding catalog view can reside in sys.objects. A table owner(s) and a user(s) with FULL CONTROL and/or VIEW DEFINITION permission can be able to see the expressions that are applied on the table.

When a query is issued against a table, it is augmented with predicates that have been applied at the table level to invoke the necessary security restrictions. When a SELECT is issued against the table, the query is internally augmented with all the predicates that have been applied on the table by virtue of GRANT SELECT or DENY SELECT statements. When an UPDATE is issued against the table, the query is internally augmented with all the BEFORE and UPDATE predicates applied to the table by virtue of the GRANT/DENY, UPDATE For BEFORE and SELECT statements. For BEFORE UPDATES, the restrictions specified in the predicates are based on the current values in the rows and not the updated values. AFTER, UPDATE and INSERT restrictions behave like constraints; they act on the after image of the update. It is only possible to update rows that the user currently has access to select. When a DELETE is issued, the query is augmented with the predicates applied to the table by virtue of the GRANT/DENY SELECT and DELETE statements. The user can only delete rows currently selected. The security expressions defined on the table are applied before any other predicate is applied; user predicates are pushed below all the security predicates in the evaluation tree.

If there are multiple security predicates, the predicates specified in the GRANTS are ORed and the negative of respective predicates specified by virtue of DENY's are ANDed to these. In addition, table level or column level permissions can be set without row level security. With the introduction of row level security, the user has access to those rows with which explicit access has been granted. Thus, what a user sees in a particular table is an intersection of the column level and row level permissions. In order to allow for row level security, the table has to first be marked as such. This can be done using the ROW_SECURITY flag in the CREATE/ALTER TABLE syntax (e.g., ALTER TABLE SET ROW_SECURITY=ON).

When the table has been enabled for row level security, the owner can determine whether row level security applies to certain individual rows. This can be done utilizing predicates that grant access to one or more rows. The Exempt Row Security permission can also be utilized to achieve the same effect. This permission can ensure that none of the security predicates are applied to the query when the grantee issues one against the table, which achieves the effect of not applying row level security, as row level security is only applied through the predicates. The Exempt Row Security permission is also useful in that it allows the owner to selectively decide who should receive row level security. It is to be appreciated that predicates can be applied to the table at any time; however, these will only be augmented to queries of users that do not have the ExemptRowSec permission.

As noted above, it can be useful to grant certain users the ability to query the table without augmenting the query with the predicates. In addition, it can be useful to temporarily disable row level security without having to add, remove and/or alter some or all predicates. This can be done by granting a ExemptRowSec permission. Table Owners, members of the db_owner and sysadmin roles and users with CONTROL permission have this permission by default. For example, to exempt a user1 from row level security checks on a Table T, the following can be utilized:

GRANT ExemptRowSec ON T TO <user1>.

When this statement is issued, user1's queries to table T are not augmented with any predicates. This permission can only be granted at the table level and not at the column level.

Since predicates can include calls to functions that in turn call other tables that could also have predicates defined on them, it is important to trap cases where there may be a circular loop. For example, if Table T has a predicate defined on it that is essentially a call to function F, which in turn queries Table T and Table S, the predicates can be applied on Table S, but not the predicates on table T (because the latter would cause an endless loop otherwise), and, thus, trapping such cases of circular predicates, but only when the number of hops in the circle is less than n, but where n is the same number used to trap circular dependencies for views. In an audit trail, a privileged user can view an augmented query.

The following illustrates exemplary SQL CREATE TABLE and ALTER TABLE utilities.

CREATE TABLE

Syntax:
CREATE TABLE
    [ database_name.[ owner ] . | owner. ] table_name
    ( { < column_definition >
        | column_name AS computed_column_expression
        | < table_constraint > ::= [ CONSTRAINT constraint_name ] }
          [ { PRIMARY KEY | UNIQUE } [ , ... n ]
    )
[ ON { filegroup | DEFAULT } ]
[ TEXTIMAGE_ON {filegroup | DEFAULT } ]
[ WITH ROW SECURITY = (ON | OFF)
< column_definition > ::= { column_name data_type }
    [ COLLATE < collation_name > ]
    [ [ DEFAULT constant_expression ]
    | [ IDENTITY [ ( seed , increment )
      [ NOT FOR REPLICATION ] ] ]
    ]
    [ ROWGUIDCOL]
    [ < column_constraint > ] [ ... n ]
< column_constraint > ::= [ CONSTRAINT constraint_name ]
    { [ NULL | NOT NULL ]
    | [ { PRIMARY KEY | UNIQUE }
      [ CLUSTERED | NONCLUSTERED ]
      [ WITH FILLFACTOR = fillfactor ]
      [ON {filegroup | DEFAULT} ] ]
    ]
    | [ [ FOREIGN KEY ]
      REFERENCES ref_table [ ( ref_column ) ]
      [ ON DELETE { CASCADE | NO ACTION } ]
      [ ON UPDATE { CASCADE | NO ACTION } ]
      [ NOT FOR REPLICATION ]
    ]
    | CHECK [ NOT FOR REPLICATION ]
    ( logical_expression )
}
    < table_constraint > ::= [ CONSTRAINT constraint_name ]
      { [ { PRIMARY KEY | UNIQUE }
        [ CLUSTERED | NONCLUSTERED ]
        { ( column [ ASC | DESC ] [ , ... n ] ) }
        [ WITH FILLFACTOR = fillfactor ]
        [ ON {filegroup | DEFAULT } ]
      ]
      | FOREIGN KEY
        [ ( column [ , ... n ] ) ]
        REFERENCES ref_table [ ( ref_column [ , ... n ] ) ]
        [ ON DELETE { CASCADE | NO ACTION } ]
        [ ON UPDATE { CASCADE | NO ACTION } ]
        [ NOT FOR REPLICATION ]
      | CHECK [ NOT FOR REPLICATION ]
        ( search_conditions )
      }

ALTER TABLE

Syntax:
ALTER TABLE table
{ [ ALTER COLUMN column_name
    { new_data_type [ (precision [ , scale ] ) ]
      [ COLLATE < collation_name > ]
      [ NULL | NOT NULL ]
      | {ADD | DROP } ROWGUIDCOL }
]
| ADD
    { [ < column_definition > ]
    | column_name AS computed_column_expression
    } [ , ... n ]
| [ WITH CHECK | WITH NOCHECK ] ADD
    { < table_constraint > } [ , ... n ]
| DROP
    { [ CONSTRAINT ] constraint_name
    | COLUMN column } [ , ... n ]
| { CHECK | NOCHECK } CONSTRAINT

ALTER TABLE -continued

{ ALL | constraint_name [ , ... n ] }
| { ENABLE | DISABLE } TRIGGER
    { ALL | trigger_name [ , ... n ] }
| SET ROW SECURITY = (ON | OFF)
}
< column_definition > ::=
    { column_name data_type }
    [ [ DEFAULT constant_expression ] [ WITH VALUES ]
    | [ IDENTITY [ (seed , increment ) [ NOT FOR REPLICATION ] ] ]
    ]
    [ ROWGUIDCOL ]
    [ COLLATE < collation_name > ]
    [ < column_constraint > ] [ ... n ]
< column_constraint > ::=
    [ CONSTRAINT constraint_name ]
    { [ NULL | NOT NULL ]
    | [ { PRIMARY KEY | UNIQUE }
      [ CLUSTERED | NONCLUSTERED ]
      [ WITH FILLFACTOR = fillfactor ]
      [ ON {filegroup | DEFAULT } ]
    ]
    | [ [ FOREIGN KEY ]
      REFERENCES ref_table [ ( ref_column ) ]
      [ ON DELETE { CASCADE | NO ACTION } ]
      [ ON UPDATE { CASCADE | NO ACTION } ]
      [ NOT FOR REPLICATION ]
    ]
    | CHECK [ NOT FOR REPLICATION ]
      ( logical_expression )
    }
< table_constraint > ::=
    [ CONSTRAINT constraint_name ]
    { [ { PRIMARY KEY | UNIQUE }
      [ CLUSTERED | NONCLUSTERED ]
      { ( column [ , ... n ] ) }
      [ WITH FILLFACTOR = fillfactor ]
      [ ON {filegroup | DEFAULT } ]
    ]
    | FOREIGN KEY
      [ ( column [ , ... n ] ) ]
      REFERENCES ref_table [ ( ref_column [ , ... n ] ) ]
      [ ON DELETE { CASCADE | NO ACTION } ]
      [ ON UPDATE { CASCADE | NO ACTION } ]
      [ NOT FOR REPLICATION ]
    | DEFAULT constant_expression
      [ FOR column ] [ WITH VALUES ]
    | CHECK [ NOT FOR REPLICATION ]
      ( search_conditions )
    }

Table 1 and the following example are utilized to illustrate various exemplary aspects of the present invention.

TABLE 1

| OrderID | EmployeeID | OrderDate | ShipCountry | ShipAddress | ShipcityCode |
|---------|------------|-----------|-------------|-------------|--------------|
| 123 | ABC123 | Apr. 03, 2002 | France | Someaddr | 67854 |
| 789 | EFG789 | Aug. 25, 2001 | Spain | Someaddr | 43674 |
| 456 | XYZ980 | Mar. 03, 2002 | Germany | Someaddr | 56373 |
| 234 | SGC007 | Jun. 07, 2001 | France | Someaddr | 67443 |
| 890 | RST678 | Apr. 04, 2002 | Spain | Someaddr | 43576 |

The goal of this example is grant select to the Orders table with the following restrictions: Users who are members of the FranceMgr role can only see orders to that country; Users who are members of the SpainMgr role can only see orders to that country; and Users who are members of the Director role can see all rows.

Row level security for Table 1 is enabled via the following: ALTER TABLE Orders SET ROW_SECURITY=ON. Permission is granted to a Director, FranceMgr and SpainMgr, respectively through the following: GRANT SELECT ON Orders TO directors; GRANT SELECT ON Orders TO FranceMgr; and GRANT SELECT ON Orders TO SpainMgr. Restrictions are associated with the Director, FranceMgr and SpainMgr, respectively, through the following: CREATE EXPRESSION SeeAll ON Orders AS 1=1; CREATE EXPRESSION SpainFilter ON Orders AS (Orders.ShipCountry='Spain'); and CREATE EXPRESSION FranceFilter ON Orders AS (Orders.ShipCountry='France'). Predicates are associated to relevant roles on the Orders table through the following: GRANT SELECT ON Orders TO Directors Where SeeAll; GRANT SELECT WHERE (SpainFilter) ON Orders to SpainMgrs; and GRANT SELECT WHERE (FranceFilter) ON Orders to FanceMgrs. Alternatively, Grant ExemptRowSec to Directors can be utilized to exempt members of the Directors role from any augmenting of row level predicates, so when the member of the Directors role queries the table the query is not augmented with any of the predicates.

The predicates can be queried, wherein the following predicates are associated with the table: Directors; SpainFilter; and FranceFilter. At the time of querying, the query can be augmented with the above predicates, such that an original query defined by SELECT*FROM Orders is augmented to SELECT*FROM Orders WHERE ((IS_MEMBER('Directors')=1 AND 1=1) OR (IS_MEMBER('SpainMgrs')=1 AND Orders.Shipcountry='Spain') OR (IS_MEMBER ('FranceMgrs')=1 AND Orders.Shipcountry='France')).

This augmented query will bring about the security restrictions required. So now, if a member of the Directors, FranceMgrs or SpainMgrs role were to perform the following query she would get only those Orders that were placed after Jan. 1, 2002 AND where the ship Country was any country, France and Spain, respectively.

Original query:

SELECT * FROM ORDERS
WHERE OrderDate > '1/1/02.

Augmented query:

SELECT * FROM ORDERS
WHERE OrderDate> '1/1/02'
AND
(
(IS_MEMBER('Director') = 1 AND 1 = 1)
OR
(IS_MEMBER('SpainMgrs') = 1 AND Orders.Shipcountry = 'Spain')
OR -continued (IS_MEMBER('FranceMgrs') = 1 AND Orders.Shipcountry = 'France')
)

Figure 10:
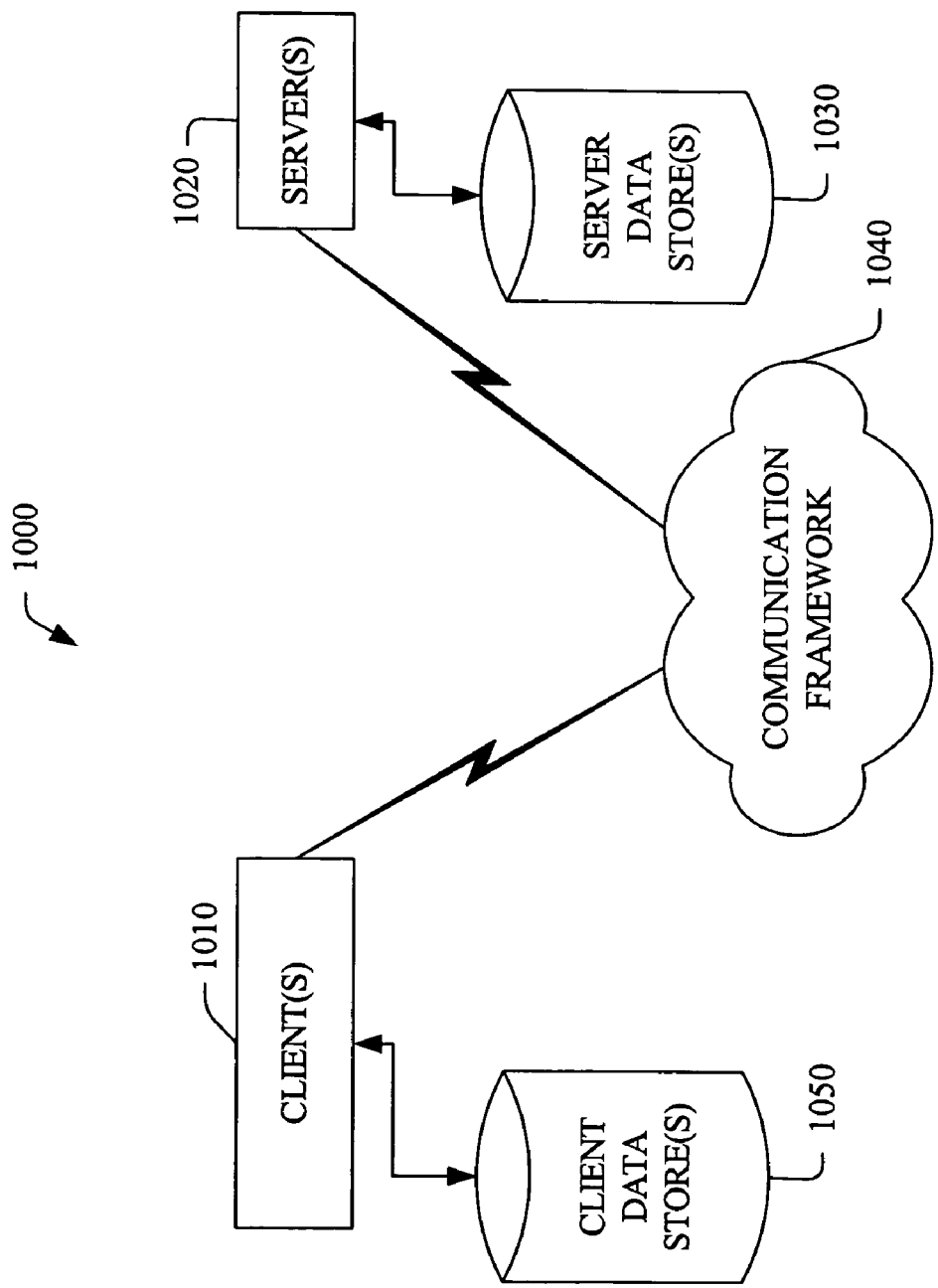
FIG. 10 illustrates an exemplary networking environment, wherein the novel aspects of the present invention can be employed.
Figure 11:
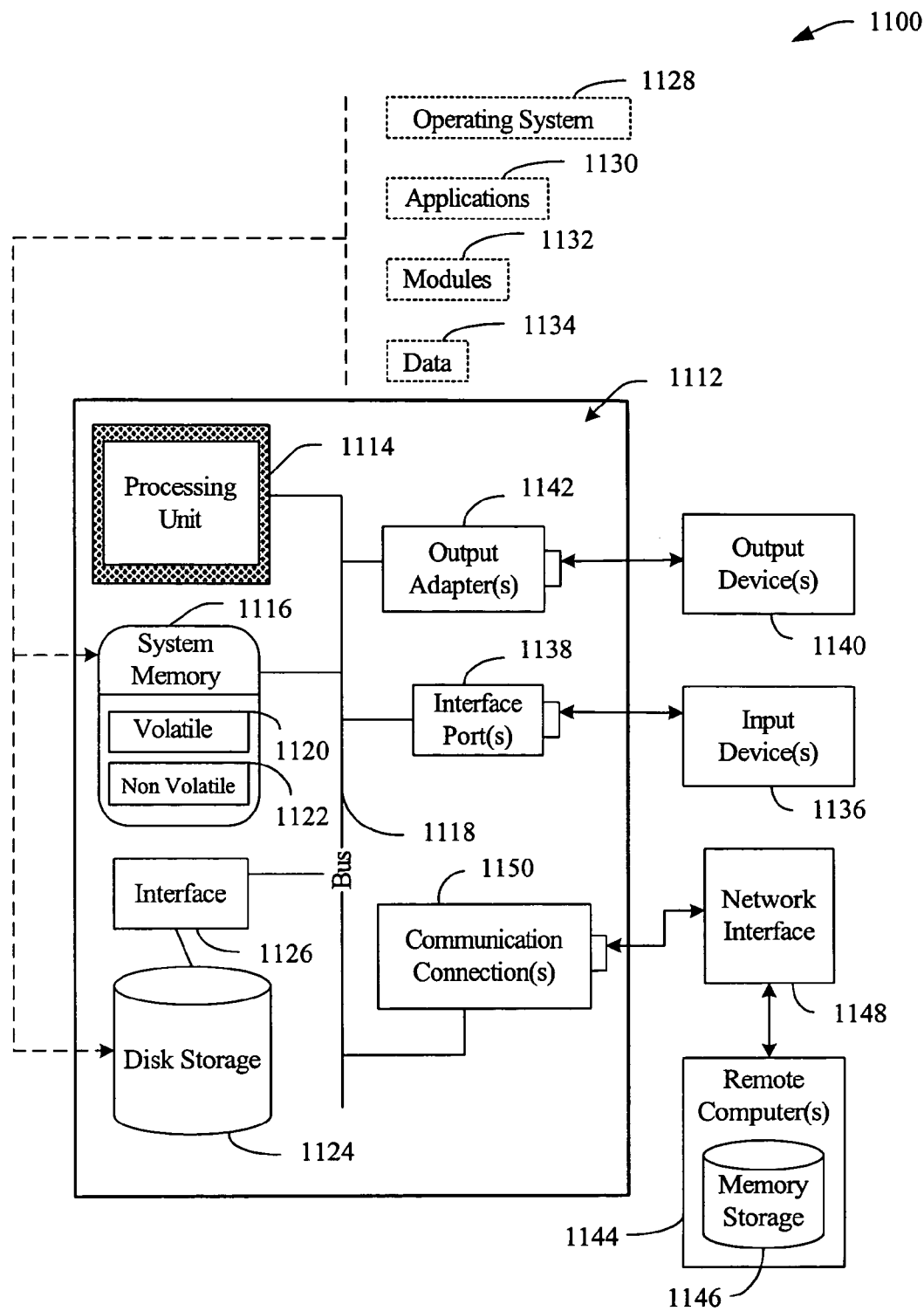
FIG. 11 illustrates an exemplary operating environment, wherein the novel aspects of the present invention can be employed.

In order to provide additional context for implementing various aspects of the present invention, FIGS. 10-11 and the following discussion is intended to provide a brief, general description of a suitable computing environment in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the present invention, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1040.

With reference to FIG. 11, an exemplary environment 1100 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM(DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates database security, comprising:
   an input component that receives a query, wherein the query includes a unique identifier that specifies a user generating the query;
   an expression bank that receives a plurality of row-level security expressions defined by an administrator of a database, wherein the plurality of row-level security expressions are functions of data organized in a single database table of the database and define access to one or more rows of data stored in the single database table, wherein each row-level security expression includes one or more unique identifiers such that each row-level security expression is only accessible to those queries whose unique identifier matches one of the one or more unique identifiers of each row-level security expression, wherein at least one of the plurality of row-level security expressions grants the user access to the data stored in the single database table and at least one of the plurality of row-level security expressions denies the user access to the data stored in the single database table;
   a query management component that inserts one or more of the row-level security expressions into the received query to generate an augmented query such that the augmented query includes all the information included in the received query and the inserted one or more row-level security expressions, the augmented query being utilized by the database to search data and return rows of data of the single database table that satisfy at least an aggregate of the row-level security expressions inserted into the augmented query such that the at least one row-level security expression granting access is satisfied and the at least one row-level security expression denying access is not satisfied; and
   an optimizer that employs rules of predicate to order the row-level security expressions in the query and non-security expressions in the query to ensure execution of the row-level security expressions prior to execution of the non-security expressions during data row evaluation to prevent information leaks.

2. The system of claim 1, the augmented query includes row-level security expressions comprising a conjunction of:
   a disjunction of Boolean expressions that grant row access when satisfied; and
   a conjunction of complements of Boolean expressions that deny row access when satisfied.

3. The system of claim 1, the row-level security expressions include a special tag that distinguishes the row-level security expressions from non-security expressions.

4. The system of claim 1, the optimizer utilizes the rules of predicate to at least one of pull non-security expressions above security expressions or push non-security expressions below security expressions.

5. The system of claim 1, further comprising a component that performs a static analysis on the augmented query at compile-time, the component determines whether non-security expressions within the augmented query are safe, a safe expression executes without risk of information disclosure from a security breach.

6. The system of claim 1, further comprising a component that performs a dynamic analysis on the augmented query at run-time, the component determines whether non-security expressions are safe, a safe expression executes without risk of information disclosure from a security breach.

7. The system of claim 6, the component concludes the dynamic analysis following successful execution of all security expressions in the augmented query.

8. The system of claim 1, further comprising a component that detects safety violations, the component at least one of and aborts the query or re-starts the query in a safe mode.

9. The system of claim 8, the safe mode ensures security expressions are employed to evaluate rows of data prior to employing non-security expressions.

10. The system of claim 1, the security expressions are Boolean expressions.

11. The system of claim 1, one or more security expressions are created via SQL statements for a row of data by the administrator of the data.

12. A method for employing row-level database security, comprising:
    obtaining a plurality of row-level security expressions for a query wherein the query includes a unique identifier that specifies a user generating the query, wherein the plurality of row-level security expressions are defined by an administrator of a database, wherein the plurality of row-level security expressions are functions of data organized in a single database table of the database and define access to one or more rows of data stored in the single database table, wherein each row-level security expression includes one or more unique identifiers such that each row-level security expression is only accessible to those queries whose unique identifier matches one of the one or more unique identifiers of each row-level security expression;
    employing a processor to generate an expression comprising a conjunction of:
       a disjunction of Boolean row-level security expressions that grant row access when satisfied; and
       a conjunction of complements of Boolean row-level security expressions that deny row access when satisfied;
    the Boolean row-level security expressions defined from the one or more row-level security expressions for the query, the generated expression combines the grant row access expression and the deny row access statement with a conjunction to enable access when at least one grant row access expression is satisfied and no deny row access expressions are satisfied; and
    utilizing the processor to insert the generated expression into the query such that the query includes all of the information of the original query and so that the security expressions are utilized to evaluate a row of data of the single database table prior to execution of non-security expression of the query.

13. The method of claim 12, further comprising employing SQL statements to at least one of create, associate or revoke security expressions.

14. The method of claim 12, further comprising employing SQL statements to at least one of grant or deny a permission to a row(s) of data to a user.

15. The method of claim 12, further comprising inserting the one or more row-level security expression into the query to optimize performance when the query does not include an unsafe non-security expression.

16. The method of claim 12, further comprising utilizing predicate rules of movement to facilitate ordering the security expressions within the query.

17. The method of claim 16, the predicate rules define whether to pull or push a non-security expression above or below a security expression to improve performance and mitigate data leaks.

18. The method of claim 12, further comprising performing a static analysis to determine whether a non-security expression is unsafe.

19. The method of claim 12, further comprising performing a dynamic analysis to determine whether a non-security expression is unsafe.

20. The method of claim 12, further comprising defining logical non-security expressions as safe expressions.

21. The method of claim 12, further comprising re-starting a query in safe mode when a safety violations is detected, safe mode ensures security expressions are utilized to evaluate row data prior to non-security expressions.

22. A system that facilitates row-level database security, comprising:
    an input component that obtains a query from a user, the query relates to data in a table of a database, the query includes a unique identifier that specifies the user;
    a query management component that obtains one or more row-level security expressions from an expression bank based at least in part on unique identifier of the user, the expression bank retains a plurality of row-level security expressions defined as functions of the data organized in the database table of the database and define access to one or more rows of data stored in the database table, wherein each row-level security expression includes one or more unique identifiers such that each row-level security expression is only accessible to those queries whose unique identifier matches one of the one or more unique identifiers of each row-level security expression, wherein at least one of the plurality of row-level security expressions grants the user access to the data stored in the database table and at least one of the plurality of row-level security expressions denies the user access to the data stored in the database table,
    the query management component inserts the obtained one or more row-level security expressions into the query from the user to generate an augmented query that includes all the information included in the received query and the inserted one or more row-level security expressions, the augmented query can be applied against the database to retrieve a subset of data in accordance with the one or more row-level security expressions.

23. A computer program product for use at a computer system, the computer program product for implementing a method employing row-level database security, the computer program product comprising one or more physical computer-readable storage media having stored thereon computer-executable instructions that when executed by a processor cause the computer system to perform the following:
    receive a query, wherein the query includes a unique identifier that specifies a user generating the query;
    receive a plurality of row-level security expressions defined by an administrator of a database, wherein the plurality of row-level security expressions are functions of data organized in a single database table of the database and define access to one or more rows of data stored in the single database table, wherein each row-level security expression includes one or more unique identifiers such that each row-level security expression is only accessible to those queries whose unique identifier matches one of the one or more unique identifiers of each row-level security expression, wherein at least one of the plurality of row-level security expressions grants the user access to the data stored in the single database table and at least one of the plurality of row-level security expressions denies the user access to the data stored in the single database table;
    insert one or more of the row-level security expressions into the received query to generate an augmented query such that the augmented query includes all the information included in the received query and the inserted one or more row-level security expressions, the augmented query being utilized by the database to search data and return rows of data of the single database table that satisfy at least an aggregate of the row-level security expressions inserted into the augmented query such that the at least one row-level security expression granting access is satisfied and the at least one row-level security expression denying access is not satisfied; and
    employ rules of predicate to order the row-level security expressions in the query and non-security expressions in the query to ensure execution of the row-level security expressions prior to execution of the non-security expressions during data row evaluation to prevent information leaks.

* * * * *